United States Patent [19]

Negishi

[11] Patent Number: 4,547,048
[45] Date of Patent: Oct. 15, 1985

[54] SPECTACLE FRAME FOR MULTIFOCAL LENSES

[76] Inventor: Tohru Negishi, 264-2, Bonsai-cho, Ohmiya-shi, Saitama-ken, Japan

[21] Appl. No.: 624,793

[22] Filed: Jun. 26, 1984

Related U.S. Application Data

[63] Continuation of Ser. No. 355,208, Mar. 5, 1982, abandoned.

[30] Foreign Application Priority Data

Apr. 17, 1981 [JP] Japan .................................. 56-59000
Aug. 11, 1981 [JP] Japan ................................ 56-124803

[51] Int. Cl.$^4$ ......................... G02C 1/00; G02C 5/20; G02C 5/14
[52] U.S. Cl. ..................................... 351/137; 351/88; 351/115; 351/119
[58] Field of Search ................ 351/88, 115, 119, 120, 351/121, 137, 153

[56] References Cited

U.S. PATENT DOCUMENTS

| | | |
|---|---|---|
| 1,784,013 | 12/1930 | Kern .............................. 351/137 X |
| 2,321,083 | 6/1943 | Higgins . |
| 2,322,993 | 6/1943 | Zell . |
| 2,326,846 | 8/1943 | Fair . |
| 3,476,466 | 11/1969 | Hopkins ........................ 351/153 X |
| 3,907,410 | 9/1975 | Richmond et al. . |
| 4,113,365 | 9/1978 | Koketsu ......................... 351/137 X |
| 4,367,929 | 1/1983 | Fortini .............................. 351/119 |

FOREIGN PATENT DOCUMENTS

| | | |
|---|---|---|
| 1132355 | 9/1983 | Fed. Rep. of Germany ...... 351/115 |
| 1540371 | 8/1968 | France ................................ 351/137 |
| 50-138947 | 11/1975 | Japan . |
| 53-986 | 1/1978 | Japan . |
| 53-158249 | 12/1978 | Japan . |
| 56-5116 | 1/1981 | Japan . |
| 57-53725 | 3/1982 | Japan . |

Primary Examiner—Rodney B. Bovernick
Attorney, Agent, or Firm—Wenderoth, Lind & Ponack

[57] ABSTRACT

A frame for multifocal spectacles includes a side piece attached to each of a pair of lens rims through a hinge mechanism which permits downward rotation of the side piece relative to the rim through a prescribed angle. A nosepad is mounted on each of the lens rims through a level adjusting mechanism by which the nosepad is vertically moved causing the level of the lens rims to be altered in correspondence to the change of inclination of the side piece.

By means of the hinge mechanism, through a simple operation, each lens segment of the multifocal lens can be used at the optimum angle with respect to the line of vision, and by means of the level adjusting mechanism for moving the nosepad vertically, each lens segment is moved vertically to the level most suitable relative to the line of vision. At the same time neatness of appearance and decrease of eye fatigue result, whichever pair of lens segments is used.

14 Claims, 22 Drawing Figures

Fig. 13
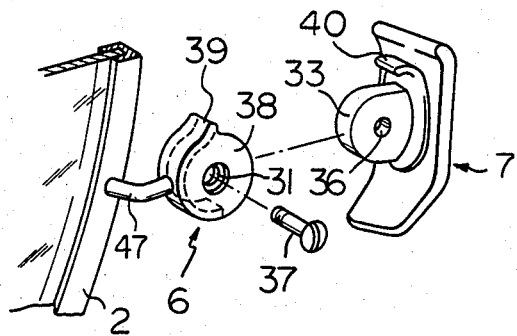
Fig. 14
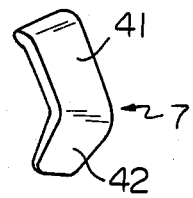
Fig. 15
Fig. 16
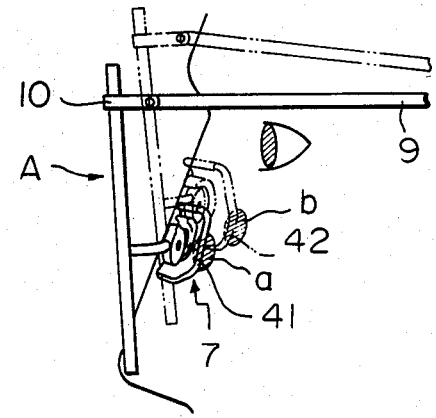

SPECTACLE FRAME FOR MULTIFOCAL LENSES

This application is a continuation, of now abandoned application Ser. No. 355,208, filed Mar. 5, 1982.

BACKGROUND OF THE INVENTION

1. Technical Field

The present invention relates to a frame for multifocal spectacles of the type in which the multifocal lenses can, by a simple operation, be both moved vertically and also tilted to change the angle of inclination relative to the normal line of vision (referred to as the horizontal line of vision when looking into the distance) so that the spectacles can always be worn with comfort whichever segment of the multifocal lens combination is used.

2. Description of the Prior Art

The following publications comprise the closest known prior art:

(1) Regarding the hinge mechanism which permits downward rotation of the side piece relative to the rim:

Japanese U.M. Public Disclosure Nos. 80554/48, 140453/50, 42648/53, 79043/53, 60112/55, 178118/55 and 4118/56 and Japanese U.M. Publication Nos. 3159/25, 4970/29 and 15019/41.

(2) Regarding the level adjusting mechanism which permits vertical movement of the nosepads relative to the rim:

Japanese U.M. Public Disclosure Nos. 164217/56, 142017/56, 5116/55, 152512/55, 111216/55, 84605/55, 69119/55, 100620/54, 158249/53, 143649/53, 79940/52, 138947/50 and 88747/48, and Japanses U.M. Publication Nos. 47966/53, 39561/53, 986/53, 24291/46, 9637/42 and 7854/25.

Background Art

Various spectacles with bifocal lenses have been developed in which moving the nosepad pair up or down moves the spectacle frame in the vertical direction to permit proper use of the distance and close-up lens segments. However, these spectacles not only possess a complex mechanism but are also troublesome to manipulate. In addition, the lenses are ordinarily set at an angle that favors the use of the long distance lens segments, and the angle of inclination does not change. When the close-up lens segments are used, therefore, these lens segments are not perpendicular to the line of vision. This is a cause of eye fatigue. The object of the present invention is to provide a frame for multifocal spectacles capable not only of vertical movement relative to the normal line of vision but also of angular displacement in relation to the wearer's face by a simple operation, so that an optically ideal condition can be kept whichever pair of lens segments is used.

SUMMARY OF THE INVENTION

The multifocal-spectacle frame according to the present invention comprises a pair of lens rims to mount rightside and leftside multifocal lenses therein, a bridge connecting the lens rims, a nosepad for supporting the inner side of each lens rim on the nose sides, and a side piece attached to the outer side of each of the lens rims. The frame is characterized in that:

the side piece is attached to the outer side of each lens rim through a respective hinge mechanism which makes it possible for the side piece to be tilted downward relative to the rim through a prescribed angle, and the nosepad is attached to the inner side of each lens rim through a level adjusting mechanism for moving the nosepad vertically to change the relative height of the lens rims with respect to the normal line of vision corresponding to the downward tilt of the side piece.

Thus, in accordance with the present invention, when the pair of close-up lens segments is used, the lens surfaces, namely the lens rims supporting the lenses, are tilted by the hinge mechanisms which tilt the side pieces downwardly, so that the lenses take on the optimum angle with respect to the line of vision for close-up work (tilted slightly forward with respect to the normal line of vision). At the same time, the close-up lenses are aligned with the height of the line of vision for close-up work by the nosepad level adjusting mechanism which changes the relative height of the lens rims with respect to the normal line of vision. Hence, optically ideal conditions for the lenses can be established, whether the distance or the close-up lens segments are used. Thus the spectacles can always be worn in comfort with little eye fatigue.

BRIEF DESCRIPTION OF THE DRAWINGS

FIG. 13 is an exploded, perspective view of the principal part of a third embodiment of this invention;

FIG. 14 is a perspective view of a principal part of FIG. 13;

FIG. 15 is a perspective view for describing the operation of the principal part in FIG. 13;

FIG. 16 is a view for describing the operation of the third embodiment;

BEST MODE FOR CARRYING OUT THE INVENTION

Embodiments of this invention will hereinafter be described in conjunction with the accompanying drawings.

Figure 1:
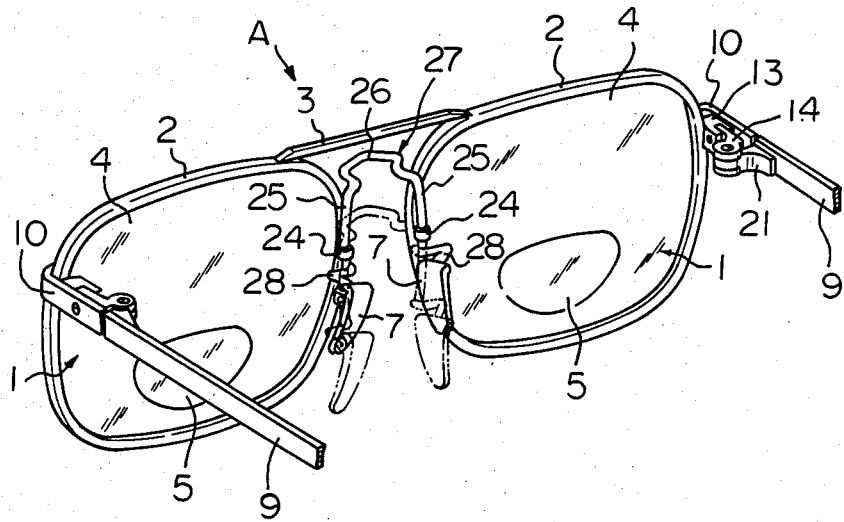
FIG. 1 is a perspective view of a first embodiment of the present invention.

FIG. 1 is a perspective view of a first embodiment of the bifocal spectacles of the present invention. The character A generally designates the main body of the spectacle frame. The main body A comprises a pair of leftside and rightside lenses 1, 1, a pair of lens rims 2, 2 for the lenses 1, 1, and a bridge 3 linking the paired rims 2, 2 at the portions slightly above center. Each of the lenses 1, 1 is a bifocal lens in which close-up lens segments 5, 5 are formed integral with long the distance lens segments at the lower part thereof.

Conventional bifocal spectacles are substantially the same in construction.

Figure 2:
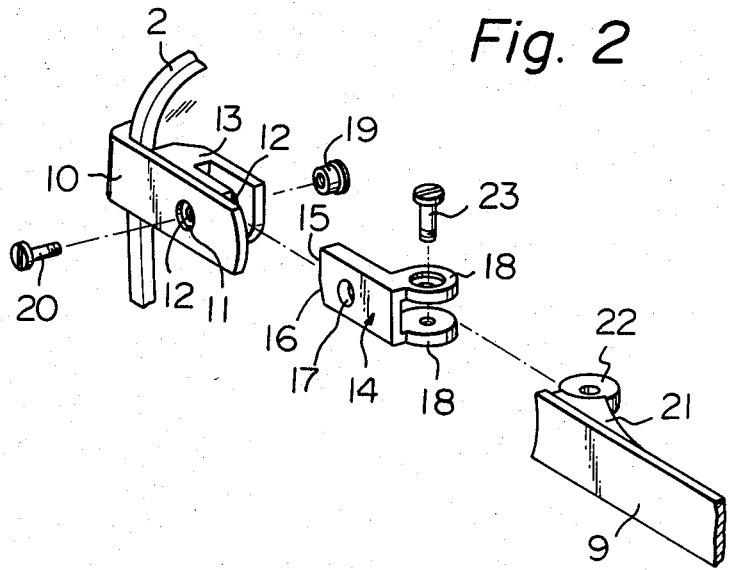
FIG. 2 is a perspective, exploded view of the principal components of the first embodiment.
Figure 3:
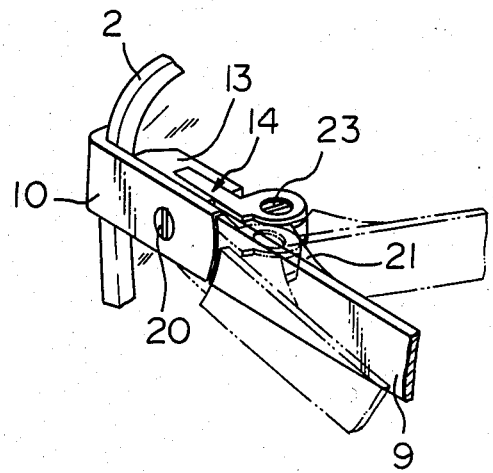
FIG. 3 is a perspective view of the components in assembled form of FIG. 2.

Side pieces 9, 9 are each attached to the rims 2, 2 at their outer edge in such a manner that each side piece 9, 9 is capable of being folded inwardly and tilted up and down. With respect to FIGS. 2 and 3, the manner in which the side pieces 9, 9 are attached will hereinafter be explained. FIG. 2 is an exploded, perspective view showing a mounting mechanism. The front end of the support 10 is rigidly attached to the outer side of each rim 2. The rear edge of the support 10 is cut in a curve, and a hole 11 is drilled near the curved edge. A holder 13 of generally U-shaped cross section and which is provided with two holes 12, 12 is attached to the inner surface of the support 10 by brazing with the holes 12, 12 of the holder 13 aligned with the hole 11 in the support 10. A separate link 14 is provided. The forward end of the link 14 is shaped in a <-configuration to form an upper abutting face 15 and a lower abutting face 16 and is formed with a hole 17 near the front edge. The rear end of the link 14 is provided with two vertically spaced rings 18, 18 one above the other. The inner surface of the lower ring 18 has female threads. The link 14 is fit into the holder 13, the hole 17 of the link 14 is aligned with the holes 12, 12 in the holder 13, a nut 19 having female threads on its inner surface is inserted in the hole 12 of the holder 13, and a male screw 20 is inserted from the hole 11 of the support 10 to be screwed into and fastened by the nut 19. A separate swiveling joint 21 is provided. The forward end of the swiveling joint 21 is provided with a ring 22. The swiveling joint 21 may be affixed to the side piece 9 by brazing. The ring 22 of the swiveling joint 21 is interposed between the rings 18, 18 of the link 14, after which a screw 23 is passed through the upper ring 18 of the link 14 and the ring 22 of the swiveling joint 21 and then screwed into and fastened by the lower ring 18. This completes assemblage, which assembled state is shown in FIG. 3. The forward end of the side piece 9 is formed into an arcuate concave shape to match the arcuate shape of the rear end of the support 10, so that, when the side piece 9 is assembled, the rear end of the support 10 and the front end of the side piece 9 will match each other.

Figure 4:
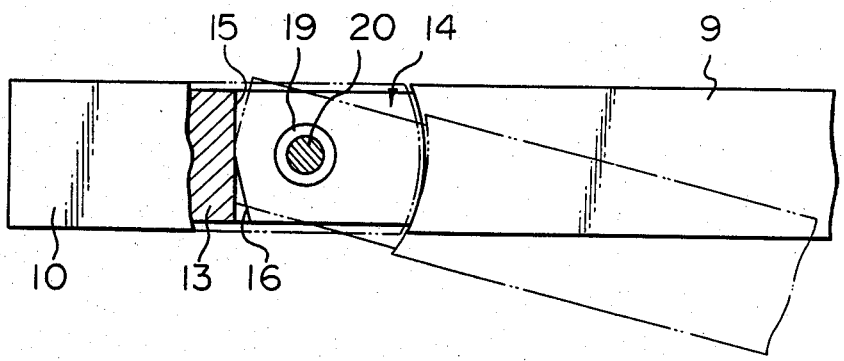
FIG. 4 is a sectionally fragmental, front view of FIG. 3.

As is apparent from FIG. 3, the side piece 9 is rotated and folded inwardly about the fulcrum formed by tightened screw 23 between the rings 18, 18 of the link 14 and the ring 22 of the swiveling joint 21. Also, it is so designed that, when the side piece 9 is rotated outwardly, the front end of the side piece 9 abuts against the rear end of the support 10. Further, the side piece 9 can be rotated in a vertically swinging movement about the nut 19 and the male screw 20 between the holder 13 and the link 14. As can best be seen in FIG. 4, the upper abutting edge 15 of the link 14 abuts against the holder 13 when the side piece 9 is rotated upwardly. Similarly, the lower abutting edge 16 of the link 14 abuts against the holder 13 when the side piece 9 is rotated downwardly. In order that the side piece 9 may be locked stably when it is rotated upwardly or downwardly and folded inwardly or outwardly a suitable frictional force is necessary. This frictional force can be obtained from the force used to tighten the screws 20 and 23. The more screw 20 or 23 is tightened, the more the U-shaped portion of the holder 13 will be pressed together, or the more the space between the rings 18, 18 of the link 14 will be narrowed, thereby increasing the frictional force. Thus, the frictional force can be regulated by adjusting the extent to which the screws 20 and 23 are tightened.

In the first embodiment of this invention as illustrated in FIGS. 1 to 6, a pair of support rings 24, 24 are securely attached to the inner sides of the rims 2, 2 slightly below the bridge 3. A slide frame 27, made of a single round bar bent into the general shape of the letter U, is composed of straight portions 25, 25 on both sides and an actuating portion 26 connecting the straight portions 25, 25 at their upper end. The straight portions 25, 25 are inserted into the support rings 24 which are secured to the respective lens rims 2, 2. When the actuating portion 26 is pinched and the slide frame 27 moved up and down, the straight portions 25, 25 are guided by the support rings 24, 24. The lower ends of the straight portions 25, 25 are respectively bent outward to form adjusting portions 28, 28. Nosepads 7, 7 are respectively mounted on the lowermost ends of the adjusting portions 28, 28. These adjusting portions 28, 28 are provided to permit the nosepads 7, 7 to adjust their position to accomodate noses of various sizes and shapes. Therefore, such adjusting portions 28, 28 may be shaped otherwise, for example, with a S-, V-, or U-shape. It should be noted that each of the straight portions 25, 25 is warped outwardly slightly, though this is not clearly seen from the drawings. When the slide frame 27 is moved up and down, forcing its straight portions 25, 25 to pass through the support rings 24, 24 a certain amount of resistance presents itself. Because of this resistance, the slide frame 27, after being slid, is capable of staying in the upper or lower position with good stability. The same effect may also be attained, for example, by attaching to the inner wall of each support ring 24, 24, a lining of synthetic resin having an inner diameter which is approximately equal to the diameter of the straight portions 25, 25 of the slide frame 27. This arrangement offers the required frictional force.

The bifocal spectacles described above are employed as illustrated in FIGS. 5 and 6.

Figure 5:
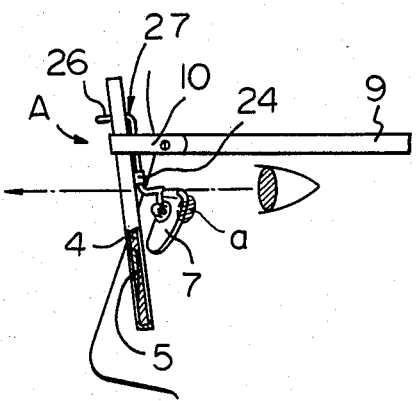
FIGS. 5 and 6 are views for describing the operation of the first embodiment in different modes.

When the wearer's gaze is directed along the normal visual line passing through the long distance lens segments 4, 4 of the spectacles, each of the side pieces 9, 9 is aligned with the support 10, or not bent, as shown in FIG. 5. The slide frame 27 is raised, so the nosepads 7, 7 hold the spectacle frame at an upper position. This raising action is done by pinching the actuating portion 26 and the bridge 3. At this time, since the nosepads 7, 7 abutting both sides of the nose are positioned relatively higher with respect to the lens rims 2, 2, the spectacle frame main body A is supported in a lowered conditions, that is, with the optic axes of the long distance lens segments 4, 4 aligned with the normal line of vision.

When the close-up lens segment pair 5, 5 is used, the object generally is near at hand; hence the line of vision is inclined downward from the normal line of vision. Accordingly, the slide frame 27 is pushed downward to move the nosepads 7, 7 to a lower position. This is achieved by spreading apart the actuating portion 26 of the slide frame 27 and the bridge 3 to widen the spacing between them. At the same time, the spectacles are worn with the main body A tilted forward. Since the nosepads 7, 7 abutting against both sides of the nose are situated downwardly and the side pieces 9, 9 are bent with respect to the supports 10, the main body A is supported at a high part of the nose while tilted slightly forward. In addition, the close-up lens segment pair 5, 5 is brought somewhat closer to the eyes. The tilt in the main body A in relation to the side pieces 9, 9, in addition to inclining the main body A, serves also to decrease the distance between wearer's ears and spectacle nosepads 7, 7, causing upward movement of the frame main body A itself. In other words, in this first embodiment, the combined effect of the angular displacement of the side pieces 9, 9 relative to the main frame body A with the lower support of the nosepads 7, 7 enables the main frame body A to be supported in a raised attitude. Thus, in the first embodiment, the amount by which the main body A is raised can be increased even when the degree of tilt in the side pieces 9, 9 is small.

Figure 6:
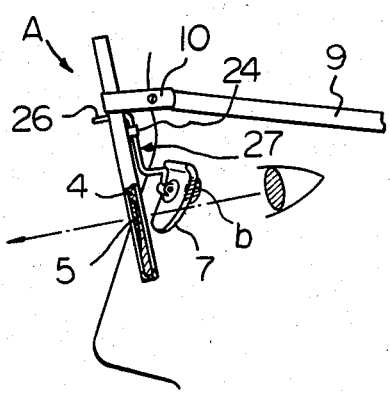
Figure 7:
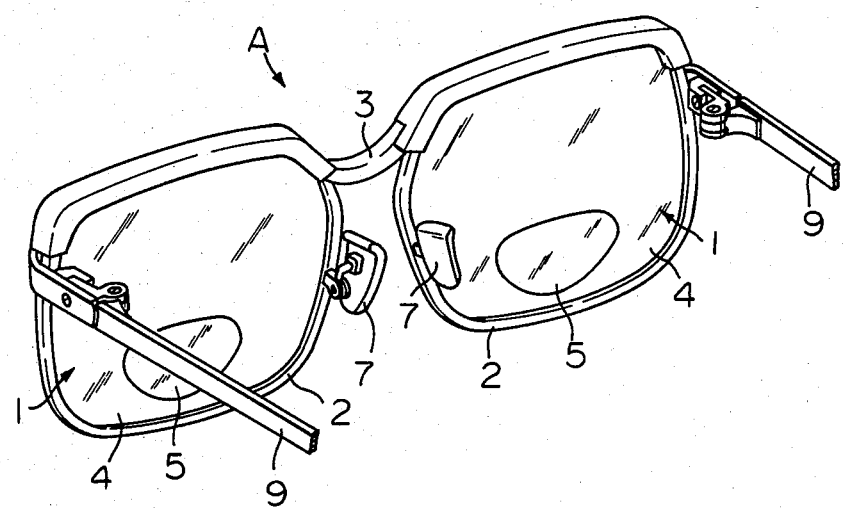
FIG. 7 is a perspective view of a second embodiment of the present invention.

A small shaded area is shown, indicated at "a" in FIG. 5 and at "b" in FIG. 6, to represent the area of the nosepad 7 that rests on the wearer's nose. It is so designed that the spacing between the nosepads 7, 7 hardly changes when the main body A is supported at the upper position "a" and at the lower position "b". Because of this arrangement, the nosepads 7, 7 are located substantially at the same point on the nose.

Figure 8:
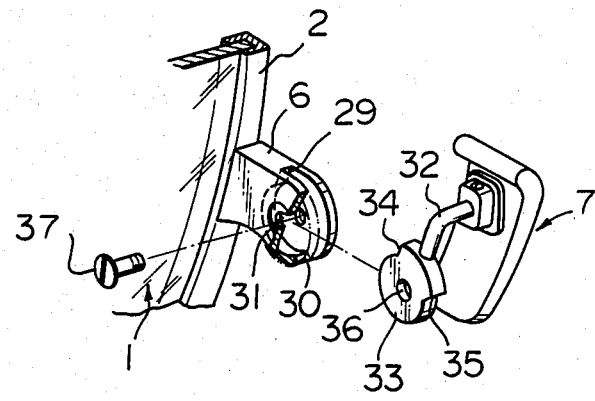
FIG. 8 is an exploded, partially sectional perspective view of the principal part of the second embodiment.

As stated above, the nosepads 7, 7 of the first embodiment are moved vertically while being slid. Now, in the second embodiment as illustrated in FIGS. 7 through 12, the nosepads 7, 7 so designed are moved vertically while being swiveled up and down. Specifically, holders 6, 6 in the second embodiment are plate-shaped and have a curved forward end. The nosepads 7, 7 are attached to the holders 6 in such a manner that the nosepads 7, 7 can be rotated up and down. The manner in which the nosepads 7, 7 are attached will be described in conjunction with FIGS. 8 and 9. FIG. 8 presents a fragmentary sectional, exploded perspective view of the combination of the nosepad 7 and the holder 6. The holder 6 is formed at its forward end with a semicircular slot, and with a slot, also of semicircle configuration but of smaller radius, cut in the holder 6 opposite to the other semicircular slot, so that the holder 6 has two stepped portions 29 and 30 between the two slots. A hole 31 is bored laterally through the holder 6 to receive a pin therethrough. On the backside of the nosepad 7 is mounted a pad arm 32 of generally L-shape. The pad arm 32 is provided at its other end with a swivel 33. The swivel 33 is shaped like a circle with a sector shape integrally joined to its periphery, and is sized to be closely encased in the slots of the holder 6. The swivel 3, therefore, also has two stepped portions 34 and 35 on the front and back sides of its sector portion, and is formed with a bore 36 in the center to receive a pin 37 therethrough.

Figure 9:
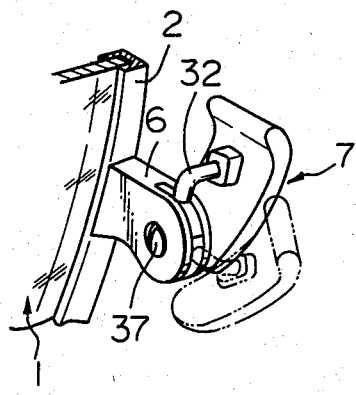
FIG. 9 is a perspective view of the principal part in assembled form of FIG. 8.
Figure 10:
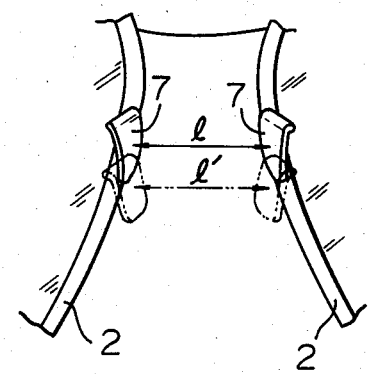
FIG. 10 is a front view depicting spacings between the nosepads in their lowered and raised positions.
Figure 11:
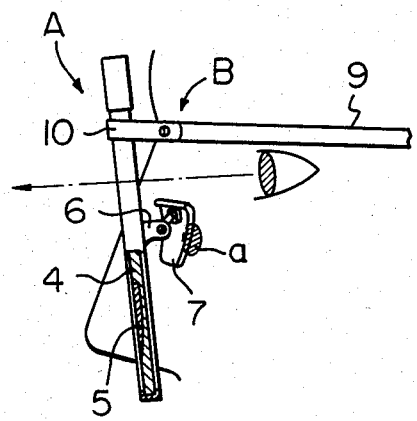
FIGS. 11 and 12 are views for describing the operation of the second embodiment in the different modes.
Figure 12:
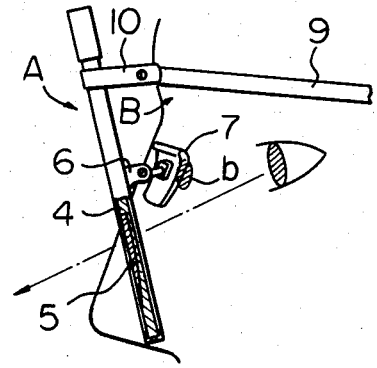

When the swivel 33 is fit into the slots of the holder 6 and the hole 31 in the holder 6 is aligned with the hole 36 in the swivel 33, the pin 37 is inserted and tightened by screwing to attach the nosepad 7 to the holder 6 via the pad arm 32 in such a manner that the nosepad 7 can be swiveled. This is shown in FIG. 9, when the nosepad 7 is rotated downward, the stepped portion 35 of the swivel 33 abuts against the stepped portion 30 in the holder 6. When the nosepad 7 is rotated upward, the stepped portion 34 of the swivel 33 strikes the stepped portion 29 in the holder 6. As shown in FIG. 10, the arrangement is such that the dimension of the spacing (l) between the nosepads 7, 7 when they are rotated to the upper position is almost the same as the spacing (l') defined by the nosepads 7, 7 when swiveled to the lower point. The second embodiment of this invention operates in the manner shown in FIGS. 11 and 12. First, when the pair of long distance lens segments 4, 4 is used, the side pieces 9, 9 are aligned with their respective support 10, as shown in FIG. 11, with the nosepads 7, 7 swiveled to the upper position. At this time as shown in FIG. 8, the stepped portions 34, 34 of the swivel 33, 33 are abutted against and stably supported by the stepped portions 29, 29 in the holders 6, 6. In this position, the main frame body A is held at a low position on the wearer's nose Then, as shown in FIGS. 11 and 12, if the pair of close-up lens segments 5, 5 is used, the nosepads 7, 7 must be rotated downward. This is achieved by manually pressing lightly the upper ends of the nosepads 7, 7 against the reversed sloping area B, B adjacent to the eyebrows on the both sides of the nose, with the main frame body A lifted slightly off the face. This will result in the nosepads 7, 7 swiveling away from the rims 2, 2. (The simple operation of lifting the main frame body A causes swiveling of the nosepads 7,7 as they abut against the reversed slopping areas B, B, so that the operation can be carried out spontaneously.)

When the nosepads 7, 7 are rotated, concurrently the main frame body A is tilted forward, which causes the side pieces 9, 9 to bend at the joint between the side pieces 9, 9 and supports 10, 10 affixed to the rims 2, 2. Downward swiveling of the nosepads 7, 7 is limited at a point where the stepped portions 35, 35 of the swivels 33, 33 abut against the stepped portions 30, 30 of the holders 6, 6 as depicted in FIG. 12. Abutting areas "b" and "b" where the nosepads contact the wearer's nose when the spectacle is set in this manner, are slightly above abutting areas "a" and "a", shown in FIG. 11.

Specifically, in FIG. 12, the distance between ear and nosepad 7 is reduced by the bend in the side piece 9. The combined effect of this reduction in distance with the lowered position of the nosepads 7, 7 supports the main frame body A at the higher position. Further, the main frame body A is supported while tilted so that the close-up lenses 5, 5 are raised slightly and tilted slightly. This brings the lenser 5, 5 close to the center of the line of vision and close to the eyes.

If the main frame body A is shifted from this elevated position to the lower position, the side pieces 9, 9 are aligned with the respective supports 10, 10, and the nosepads 7, 7 are rotated upward closer to the rims 2, 2. This is accomplished by straightening the side pieces 9, 9 then by pushing down on the main frame body A in such a manner that the nosepads 7, 7, while being pressed against the nose, will rotate downward. The spectacles need not be removed.

As already stated in reference to FIG. 10, the space between the nosepads 7, 7 when they are rotated upward is almost the same as when they are rotated downward. The spacing can be altered by an optician to fit noses of various sizes and shapes. This may be done by changing the bend angle in the pad arm 32 of the nose pad 7, thereby to regulate the vertical distance traveled by the main frame body A. Further, the pad arm 32 may incorporate an adjusting element, between the swivel 33 and the nosepad 7, similar to the adjusting portion 28 of the first embodiment.

A third embodiment of the present invention will be described with reference to FIGS. 13 to 16. Referring first to FIG. 13, an adjusting member 47 is provided secured to the lens rim 2. The configuration of the adjusting member 47 may be similar to that of the adjusting portion 28 of the first embodiment. A ring holder 38 is affixed to the forward end of the adjusting, and is provided in its leading edge with a circular slot. A hole 31 to receive a pin 37 is bored in the side of the ring holder 38, which is provided at its circumference with a protrusion 39. The nosepad 7 is provided at its backside with a swivel 33. A hole 36 is bored in the swivel 33. A projection 40 is formed just above the swivel 33 in the nosepad 7.

The nosepad 7 used in the third embodiment is of generally V-cross sectional configuration, as depicted in FIG. 14 and has an upper abutting surface 41 situated at the upper part, and a lower abutting surface 42 situated at the lower part. The parts shown in FIG. 13 are assembled into the form shown in FIG. 15. When the nosepad 7 is rotated upward, it will be stopped and stably engaged in position at a point where the projection 40 abuts lightly against the protrusion 39.

Operation of the system of the third embodiment will be briefly described in conjunction with FIG. 16. When the spectacles are worn with the nosepads 7, 7 rotated upwardly and with the main frame body A tilted forwardly, the lower abutting surfaces of the nosepads 7, 7 abut against the abutting areas b, b of the nose. When the spectacles are worn with the nosepads 7, 7 rotated downward and with the sidepieces 9, 9 aligned with the respective supports, the upper abutting surfaces 41, 41 of the nosepads 7, 7 abuts against the abutting areas a, a of the nose. When the nosepads 7, 7 are rotated upwardly, only then do the projections 40, 40 make resilient contact with the protrusions 39, 39 to be stopped thereby. Such stopping means for a case where the nosepads 7, 7 are rotated downwardly are omitted. In this embodiment, since the swivel 33 of the nosepad 7 is attached at a slightly upper position, the nosepad 7 can be stably retained when the upper abutting surface 41 is used. When the lower abutting surface 42 is used, however, a downwardly rotative force acts upon the nosepad 7. Hence the stopping means are provided solely on the upper portion. The same effect can be obtained without any stopping means as by suitable friction exerted by means of pin 37 located between the curved recess found in the ring holder 38 and the swivel 33 of the nosepad 7. Thus, the incorporation of such a stopping means depends altogether on the location of the swivel 33 on the nosepad 7 or on the manner of attachment. Other arrangements can be employed as the stopping means.

As will be apparent from the above, the nosepad 7 is formed to have an L-shaped cross section comprising an upper abutting surface 41 and a lower abutting surface 42. The object of such a bent contact surface is to hold the main frame body A in position on the sides of the nose in its upper and lower positions. Another object is to compensate for the change of angle that the nosepad front surface makes with the wearer's nose surface as the frame main body A is shifted.

Figures 17A, 17B, 17C, 17D:
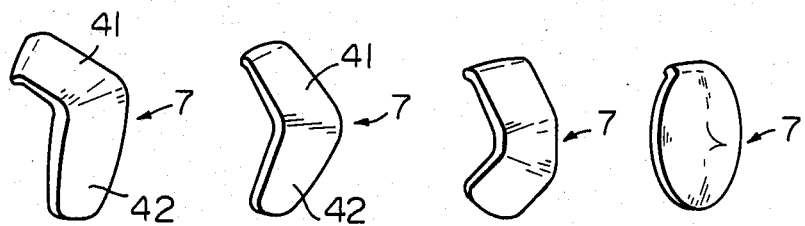
FIGS. 17A-D present perspective views of various modifications of the principal part of the third embodiment.

In the nosepad 7 of the third embodiment, the upper abutting surface 41 has a larger surface area that the lower abutting surface 42, as can best be seen in FIG. 14. However, the lower abutting surface 42 may be made larger in surface area than the upper one 41, as shown in FIG. 17(A). Alternatively, they may have an equal surface area as shown in FIG. 17(B). Trifocal spectacles may employ nosepads 7 of having three abutting surfaces, as shown in FIG. 17(C). FIG. 17(D) presents a view of the nosepad 7 of a largely circular front face for use with spectacles with lenses having more than three different foci. Throughout the views in FIGS. 14 to 17, only the leftside nosepad 7, as viewed from the wearer, has been depicted for clarity of illustration. The rightside nosepad 7 is symmetrically opposite in configuration to the leftside one.

Figure 18:
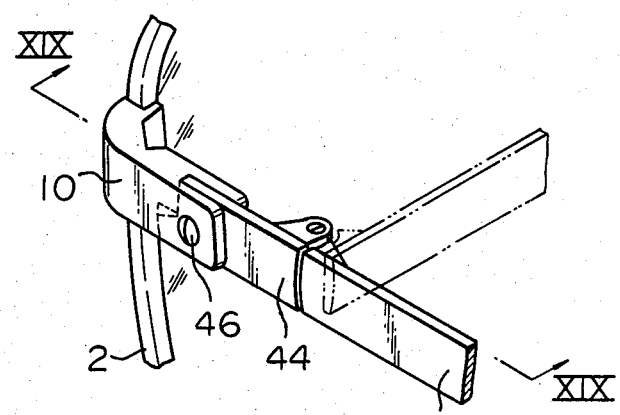
FIG. 18 is a perspective view of the principal part of a fourth embodiment of the present invention.
Figure 19:
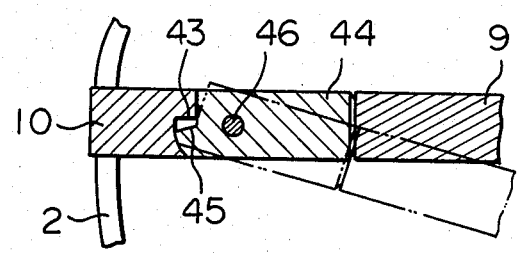
FIG. 19 is a cross-sectional view taken along the line XIX-XIX of FIG. 18.

Finally, a fourth embodiment of the present invention will hereinafter be explained in detail with respect to FIGS. 18 and 19. In the first embodiment, the mechanism is such that the side pieces 9, 9 can be folded inward or rotated downward. Only one joint can be seen from the side, giving a sense of neatness. However, the mechanism may have a structure as depicted in FIGS. 18 and 19. In this structure, the support 10 that is affixed to the rim 2 is formed at its rear edge with a longitudinal slot that is cut parallel with the surface of the side piece 9 so as to have a stepped recess portion 43. A separate link 44 also has at its forward end a stepped portion 45 for insertion into the stepped recess portion 43 and is connected to the support 10 by means of a screw 46, about which the link 44 is made rotatable. The side piece 9 may be joined to the link 44 in a conventional manner, so that the side piece 9 can be swung freely either inward with respect to the support 10 or outward to stably stay in position. Downward rotation of the side piece 9 is limited at a point where the stepped portion 45 of the link 44 contacts the stepped recess portion 43 in the slot of the support 10. When the side piece 9 is aligned with the support 10 by rotating it upwardly, the former is prevented from further rotation upward by its upper forward edge abutting against the upper edge of the support 10.

So far two examples of the hinge mechanism which is situated between side pieces 9, 9 and supports 10, 10 secured to the rims 2, 2 and by which the side pieces 9, 9 are rotated about horizontal axes and of the folding mechanism by which the side pieces 9, 9 are rotated about vertical axes have been described. However, these hinge and folding mechanisms permit respectively diverse modifications constructed on the same principle. Further, as to the level adjusting mechanism for nosepads 7, one example of the slide type level adjusting mechanism in which they are designed to reciprocate in the vertical direction and two examples of the rotative type in which the nosepads 7 are rotatable about their respective axes have been explained. Similarly, these level adjusting mechanisms permit many modificatins. It should be understood that, although the above description has been made in reference to bifocal spectacles, this invention is also applicable to other types of spectacles having three or more foci.

The operation of the system and the structure of the present invention have been extensively described, and now the advantages will be mentioned.

Multifocal spectacles constructed in accordance with the present invention have their side pieces 9, 9 secured to the outer sides of the rims 2, 2, made rotatable horizontally and vertically through a hinge mechanism. Therefore, it is possible to alter the level of the frame relative to the eyes, simply by tilting the side pieces 9, 9 downward through a corresponding angle and, if necessary, by properly positioning the movable nosepads 7, so that the required segment pair of the multifocal lense combination can optionally be elevated in front of the eyes. Additionally, in order to obtain the optimum angle of inclination in the plane of the lenses for accurate focussing of the image, the angle that the side pieces 9, 9 take with their respective supports 10, 10 can readily be adjusted. Since the lenses are set at right angles with the line of vision, distortion of the image, the major cause of eye fatigue, is prevented. In this manner, optically ideal conditions can always be maintained without difficulty by tilting or straightening the side pieces 9, 9 and, if necessary, adjusting the position of the nosepads 7, 7.

What is claimed is:

1. In a frame for spectacles especially useful for lenses with different focal lengths at different positions therein, comprising a pair of lens rims adapted to have mounted therein leftside and rightside lenses having different focal lengths at different positions therein, a bridge means for connecting between said lens rims, a nosepad means for supporting the inner side of each of said lens rims against the sides of the nose, and a side piece attached to the outer side of each of said lens rims, the improvement comprising:

a hinge means attaching each side piece to the outer side of said rim for permitting said side piece to be tilted upward and downward relative to said rim, said hinge means including limiting means for limiting the angle to which said side pieces can be tilted relative to said rim to a prescribed angle;

a level adjusting means attaching said nosepad means to the inner side of each of said lens rims and for moving the nosepad means vertically between limit positions corresponding to the respective angles to which said sidepieces can be tilted to change the relative height of said lens rims with respect to the normal line of vision;

one limit position of the level adjusting means and the corresponding prescribed angle of the side pieces orienting the rims to positions such that portion of lenses with one focal length which have been mounted in said rims lie in a preferred line of vision therefor; and a second limit position of the level adjusting means and the corresponding prescribed angle of the side pieces orienting the rims to a position such that portion of lenses with a different focal length which have been mounted in said rims lie in a preferred line of vision therefor;

whereby the tilting of the side pieces and the vertical moving of the nosepad means to the corresponding positions causes the respective different focal length portions of lenses in the rims to lie in preferred lines of vision for the respective different focal length portions of the lenses.

2. The multifocal spectacle frame of claim 1, wherein said level adjusting means for moving said nosepad means vertically comprises:

support rings secured to the inner side of each of said lens rims and having a longitudinal center hole;

a slide frame composed of a pair of straight members and an actuating member connecting the upper ends of said straight members, said straight members extending through said longitudinal center hole of each said support ring; and said nosepad means being each attached respectively to the lower ends of said straight members of said slide frame.

3. The multifocal spectacle frame of claim 2, wherein said slide frame comprises:

an adjusting member formed below each said straight member for adjustment of the position of each of said nosepad means, said nosepad means being attached to the lower ends of said respective adjusting members.

4. The multifocal spectacle frame of claim 2, wherein said slide frame is so designed that, when said slide frame moves vertically with respect to said support rings, said straight members encounter a slight resistance, and that said slide frame will stay stably in any position between its upper and lower position, with respect to said support rings.

5. The multifocal spectacle frame of claim 1, wherein said level adjusting mechanism for moving the nosepad means vertically comprises a rotary means for rotating each of said nosepad means relative to said lens rims through a predetermined angle.

6. The multifocal spectacle frame of claim 5, wherein said rotary means comprises:

a holder affixed to the inner side of each of said lens rims;

a swivel mounted on each of said nosepad means; and means for supporting said swivel and said holder for free rotation.

7. The multifocal spectacle frame of claim 6, wherein:

said holder has a stepped portion means for restricting the rotational angle of said swivel, and said swivel has a stepped portion means for abutting with the stepped portion means of said holder.

8. The multifocal spectacle frame of claim 7, wherein each of said swivels is mounted on said nosepad means by an arm member for adjustment of the position of said nosepad means.

9. The multifocal spectacle frame of claims 6 or 7, wherein each of said holders is directly affixed to the inner side of each of said lens rims.

10. The multifocal spectacle frame of claim 1, wherein each of said nosepad means has at least two faces intersecting at a predetermined angle.

11. The multifocal spectacle frame of claim 1, wherein each of said nosepad means has its face formed in a circular configuration.

12. The multifocal spectacle frame of claim 6 or 7, wherein each of said holders is affixed to the inner side of said lens rim by an adjusting member for adjustment of the position of said nosepad means.

13. The multifocal spectacle frame of claim 12, wherein each of said nosepad means has at least two faces intersecting at a predetermined angle.

14. The multifocal spectacle frame of claim 1, wherein said hinge mechanism comprises:

a support affixed to and extending rearwardly horizontally from the outer side of each said rim;

a holder affixed to the inner side of each of said supports;

a link including a forward end portion adapted for cooperation with said holder, and a rear end portion with a pair of vertically spaced rings;

a substantially horizontal axis member extending through both said holder and said link;

an intermediate ring affixed to the forward end of each of said side pieces and sized to be interposed between said paired rings of said link for rotation therebetween; and a substantially vertical axis member extending through said link and through the intermediate ring of said side piece interposed between said paired upper and lower rings of said link in such a manner that said side piece is capable of being folded inward with respect to said link.

* * * * *